United States Patent [19]

Bernstein et al.

[11] 4,254,192
[45] Mar. 3, 1981

[54] PRIMARY GALVANIC CELL

[75] Inventors: Philip Bernstein, Glen Ridge, N.J.; James P. Coffey; James W. Wilson, both of Warwick, N.Y.

[73] Assignee: The International Nickel Company, Inc., New York, N.Y.

[21] Appl. No.: 96,793

[22] Filed: Nov. 23, 1979

[51] Int. Cl.³ .............................................. H01M 2/30
[52] U.S. Cl. ................................. 429/181; 429/165; 429/170
[58] Field of Search ............... 429/133, 134, 135, 164, 429/165, 166, 167, 168, 169, 170, 171, 172, 173, 174, 181, 185

[56] References Cited

U.S. PATENT DOCUMENTS

| 2,411,272 | 11/1946 | Keller | 429/170 |
| 2,572,017 | 10/1951 | Ellis | 429/167 |
| 2,825,748 | 3/1958 | Coler | 429/167 |
| 3,420,714 | 1/1969 | Knight | 429/133 |
| 3,627,586 | 12/1971 | Jammet | 429/135 |
| 3,773,562 | 11/1973 | Pinkowski et al. | 429/133 |

Primary Examiner—Donald L. Walton
Attorney, Agent, or Firm—R. J. Kenny; E. A. Steen

[57] ABSTRACT

A primary galvanic cell (10) displaying superior leak-resistant characteristics. A molded battery container (12) having one open end (14) is sealed by an end cap (18) having both insulating (22) and conducting (20) properties. An electrode (24), integrally affixed to the end cap (18) and in electrical registry therewith, is disposed within the cell (10).

6 Claims, 3 Drawing Figures

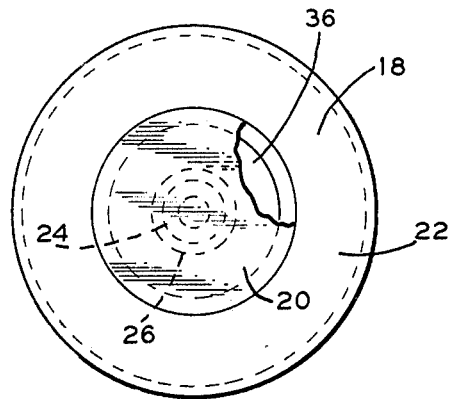
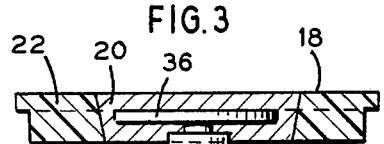
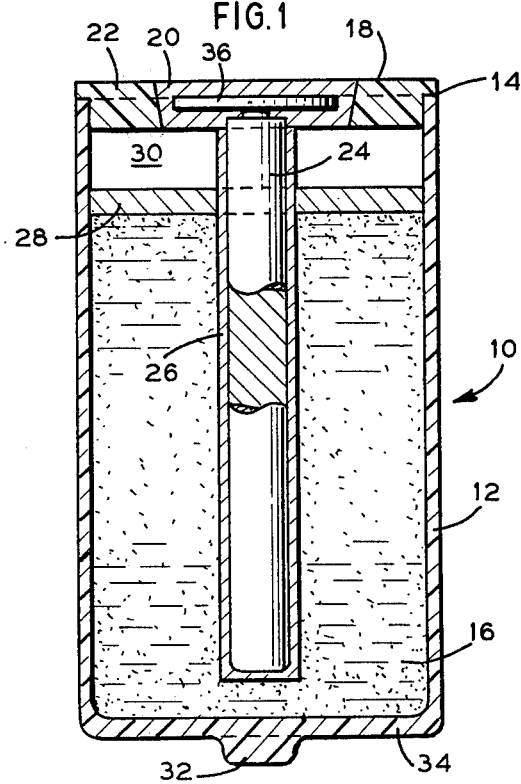

4,254,192

PRIMARY GALVANIC CELL

TECHNICAL FIELD

This invention relates to primary cells or batteries in general and more specifically to a cell construction that substantially reduces electrolyte leakage.

BACKGROUND ART

One of the biggest problems bedeviling both battery consumers and battery producers alike is that posed by battery leakage. Due to the inherent chemistry of a primary cell, the electrolyte contained therein is constantly seeking an escape route to the exterior of the battery. A review of the relevant literature over the years shows literally scores of designs and systems for eliminating or at least reducing that infamous scourge of battery manufacturers everywhere: leaking batteries. Although great strides have been made in substantially reducing this deleterious problem, research is continuously being undertaken in order to develop a truly leak-proof battery.

By the same token, the efficiency, output and shelf-life of primary batteries, have increased markedly. Over the years, new and improved battery types have been successfully developed and exploited. For example, the classical mainstay of the primary battery industry was (and still is) the LeClanché cell. However, due to the recent proliferation of battery operated devices, battery manufacturers have endeavored to create still better cell designs. As a result, the "heavy-duty" cell was developed. Similar to the LeClanché cell, this cell contains an improved electrolyte. Similarly, alkaline cells were developed to supply superior service. In addition, "inside-out" cells have shown promise in that, while presently slightly more expensive than standard LeClanché cells, they may be the most economical of all on a cost-benefit basis.

Regardless of the cell design, batteries are prone to electrolytic creep. Given even a tiny internal interface, the electrolyte contained within a cell will eventually find its way to the exterior of the cell in its inexorable search for oxygen. During this process, the electrolyte flow tends to corrode all contacts, solder joints and wires in its path. Ultimately, this degradation leads to battery failure. Furthermore, the zinc container or can present in the LeClanché and heavy-duty designs is itself consumed by the electrochemical action occurring within the cell. Thusly, the combined debilitating effects of electrolyte creep, can consumption and exhaustion of the chemical components themselves may ultimately lead to battery failure.

Clearly, a cell design that substantially reduces the problem of battery leakage is desirable.

SUMMARY OF THE INVENTION

The instant invention is directed to an apparatus for alleviating cell leakage. Accordingly, the cell consists of a molded container closed at one end and open at the other end. Disposed within the container are typical cell components, i.e., a cathode, an anode, an electrolytic paste, a separator between the anode and the cathode and a sealant creating an air gap within the cell.

The open end of the cell is sealed by an end cap attached thereto. The end cap consists of a juxtaposed insulating member and conducting element. An electrode is partially embedded within the conducting element to form an integral, dual purpose sealing and conducting unit. The unit is formed by insert molding the electrode into the end cap. The resulting unit has sufficient rigidity to act as both a seal for the cell and, in addition, as an electrical contact surface. Depending on the cell design, the electrode may be an active zinc anode, as in an inside-out cell, or it may be current collector for use in a LeClanché cell or an alkaline cell. Moreover, the container may be molded from a conductive polymer.

By employing a one-piece molded container, one source of battery leakage is eliminated. That is, present cells are mechanically sealed or crimped at both ends of the battery can. By utilizing the instant invention, the end cap is heat sealably joined to the container resulting in a sound leak-resistant seal. The molded closed end, of course, does not present a potential pathway to the exterior of the cell.

BRIEF DESCRIPTION OF THE DRAWINGS

FIG. 1 is a cross-sectional view of an embodiment of the invention.

FIG. 2 is a top-plan view of the embodiment as depicted in FIG. 1.

FIG. 3 is a cross-sectional view of a component of the invention.

BEST MODE FOR CARRYING OUT THE INVENTION

Referring to FIG. 1, there is shown a primary galvanic cell or battery 10 of the "inside-out" or external cathode type. For the purposes of this disclosure, the expressions "inside-out", "heavy-duty" (zinc chloride), "LeClanché" and "alkaline" represent standard battery designs known to practioners of the battery art. Accordingly, ordinary accepted meanings apply to these terms. Moreover, it should be appreciated that although the battery 10 is depicted as an inside-out cell, the invention disclosed herein, with little modification, may be utilized with all battery designs as well.

The cell 10 includes a container 12 having an open end 14 and an integrally molded closed end 34. The container 12 may be of any suitable electrically conductive material. It is preferred, however, to employ a conductive polymer such as CAPREZ DPP. (CAPREZ DPP is a trademark of The International Nickel Company, Inc.) CAPREZ DPP is both lightweight and easily moldable besides being an excellent electrical conductor. Disposed within the container 10 is electrolytic paste 16. The paste 16 selected will, of course, be dependent upon the type of cell.

The container 12 is sealed by end cap 18. The end cap 18 includes an inner conducting plate 20 and an outer insulating ring 22. The outer ring 22 is heat sealed about the open end 14 to form a leak-proof seal therewith. Embedded within the plate 20 (and forming an integral part of the end cap 18) is a zinc electrode 24 acting as an anode. The anode 24 has a disc-shaped upper section 36 for added rigidity and improved electrical conductivity. A separator 26, interposed between the anode 24 and the cathode (in this case, the electrolytic paste 16), circumscribes the anode 24.

A layer 28 of pitch or other suitable sealant (e.g., low molecular weight atactic polypropylene) serves to separate the electrolyte 16 from the end cap 18. The layer 28 creates an air gap 30 within the cell 10 for accommodating possible thermal expansion. Moreover, by physically separating the electrolyte 16 from the end cap 18 by the layer 28, the electrolyte 16 is afforded less of an opportunity to leak from the cell 10. Nipple 32 extends from the closed end 34 for facilitating electrical contact with other devices (not shown).

The invention and the manner of applying it may, perhaps, be better understood by a brief discussion of the principles underlying the invention.

As presently contemplated, inside-out cells may require the introduction of the anode into the cathode mix followed by the emplacement of a covering cap to seal the cell. This order of construction may necessitate the joining of the anode to the cover in such a manner that the interfacing surfaces produced may allow passage of electrolyte which manifests itself as undesirable leakage.

The availability of a conductive polymer (such as CAPREZ DPP) and a technique known as insert molding allows for the construction of a cell which has the cathode and the anode completely contained within a sealed cell structure in such a fashion that substantially reduces the source of leakage as described above. Indeed, the container 10, by virtue of the claimed design, has only one open ended section 14 that must be sealed. Contrast this simplified state of affairs with present day battery designs, which call for both ends of the can to be sealed. By eliminating two mechanically sealed joints, the chances of battery leakage are substantially reduced.

During the process of insert molding the end cap 18, an object, which in this case is the zinc anode 24, is placed into a two step composite mold prior to the introduction of the conductive polymeric material. This material, in a fluid state, is introduced into the mold about the upper section 36 to form the plate 20. Simultaneously, the insulating material (which may be a non-conductive plastic) is similarly introduced into the outer periphery of the composite mold to form the concentric ring 22 construction as shown in the figures. The mold is designed to ensure intimate contact between the anode 24 and the conductive polymer. After the mold is cooled and opened, the anode 24 is directly joined to the conductive plate 20 and indirectly attached to the insulating ring 22; these components forming end cap 18.

In order to complete the cell 10, the electrolyte 16 is introduced into the container 12. The sealing layer 28 is next deposited onto the surface of the electrolyte 16 whereupon the anode 24, previously encapsulated by the separator 26 by any suitable method, is inserted into the electrolyte 16 through the layer 28. The cap 18, positioned about the open end 14, may be heat sealed or ultrasonically welded to the container 12 to effect a leak-resistant seal.

As was discussed previously, the invention is not limited to inside out cells. For example, in a LeClanché cell or a heavy-duty cell, the container 12 may be zinc, and the electrode 24 (now acting as a current collector) may be made from carbon. Of course, the separator 26 would be interposed between the inner wall of the container 12 (now acting as the anode) and the electrolyte 16. Needless to say, however, the carbon electrode 24 would still form an integral part of the end cap 18 in the manner described herein. In this manner, the one-piece construction of the zinc container 12 coupled with the fused end cap 18 would substantially reduce the chances of electrolyte corrosion and leakage. The same form of construction (with appropriate component modifications) would apply equally to alkaline cells. Regardless of the cell type, by eliminating a mechanical seal at one end of the cell and by utilizing a fused dual purpose end cap 18 at the other end, the electrolyte is prevented from leaking out of the battery.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved galvanic cell having internal components completely disposed within the cell and not extending thereout so as to effectively reduce electrolyte leakage paths to the exterior of the cell, the cell including a container having an open end and a closed end, and an electrode, separator and an electrolyte disposed within the container, the improvement which comprises an integral triple purpose insert molded end cap sealing the open end of the container, the container made from an electrically conductive polymer, the end cap including an outer insulating ring in sealing registry with the container, an inner conducting plate circumscribed by the ring and flush therewith, the electrode insert molded into the plate and extending into the electrolyte, the electrode having anchoring means embedded into the plate, the plate completely enveloping the anchoring means so that the electrode does not indirectly extend without the container, and an integrally molded nipple outwardly extending from the closed end, the nipple independent of the electrode.

2. The cell according to claim 1 wherein the outer periphery of the end cap is heat sealed about the open end of the container.

3. The cell according to claim 1 wherein the outer periphery of the end cap is ultrasonically welded about the open end of the container.

4. The cell according to claim 1 wherein the anchoring means is an electrically conductive disc connected to the electrode.

5. The cell according to claim 1 wherein the insulating ring is made from plastic.

6. The cell according to claim 1 wherein the conducting plate is made from an electrically conductive polymer.

* * * * *